June 22, 1954  H. S. V. JÄRUND  2,681,836
BLOCK BEARING
Filed March 2, 1951
2 Sheets-Sheet 1
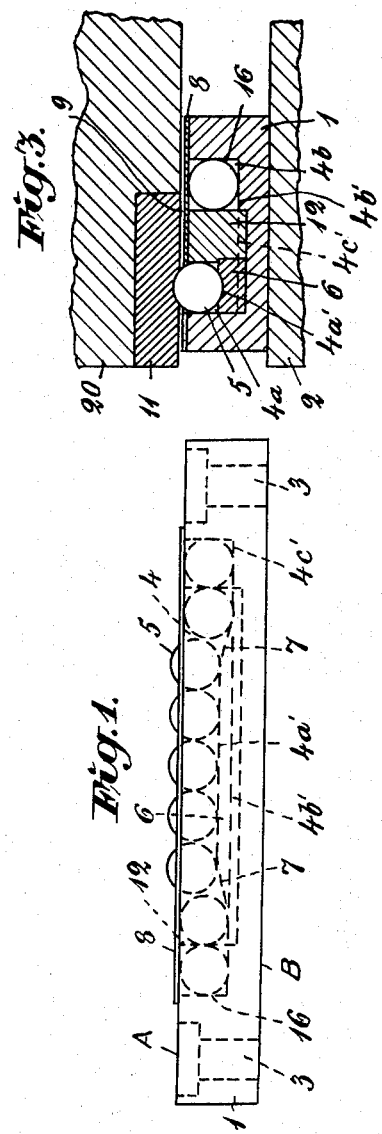
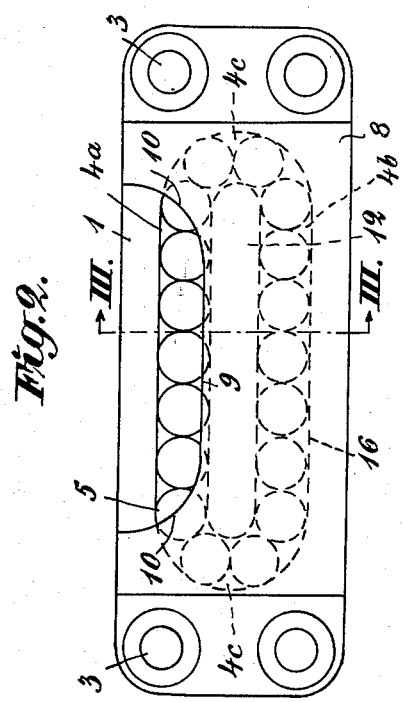
Inventor:
Harry Sigurd Valdeman Järund,
By: Pierce, Scheffler & Parker,
Attorneys.

June 22, 1954　　　H. S. V. JÄRUND　　　2,681,836
BLOCK BEARING
Filed March 2, 1951　　　　　　　　　　　　　　2 Sheets-Sheet 2
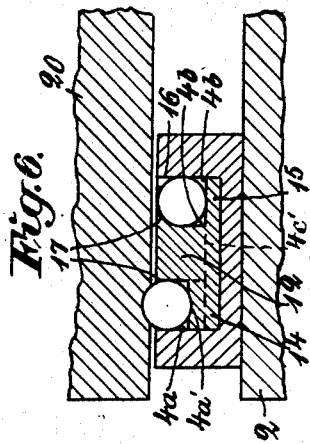
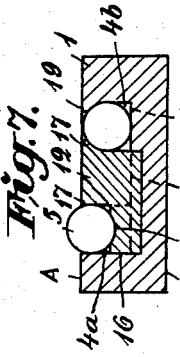
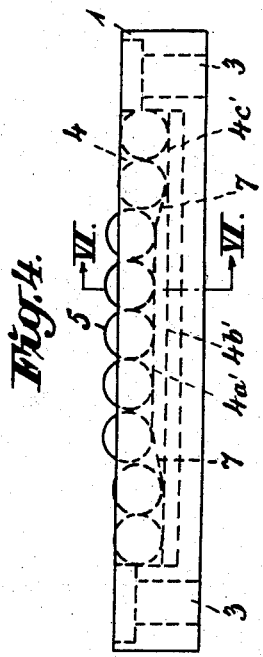
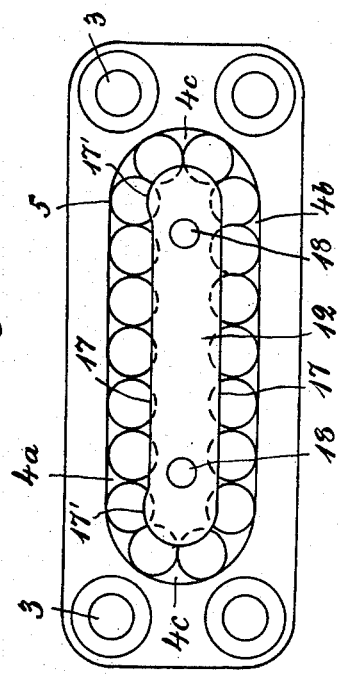
Inventor:
Harry Sigurd Valdemar Järund,
By: Pierce, Scheffler & Parker,
Attorneys.

Patented June 22, 1954

2,681,836

UNITED STATES PATENT OFFICE 2,681,836

BLOCK BEARING

Harry Sigurd Valdemar Järund, Lund, Sweden

Application March 2, 1951, Serial No. 213,602

Claims priority, application Sweden March 9, 1950

5 Claims. (Cl. 308—6)

This invention relates to block bearings in which only a portion of a series of balls guided in an endless track is under load whilst the remaining portion of said balls runs idly.

It is an object of the invention to provide a bearing of the type referred to which is ready for use and can be handled as a unit to be easily mounted between relatively movable machine elements to take the load exerted by one of said elements upon the other.

Another object of the invention consists in the provision of a bearing of the type referred to which can be handled as a unit to be easily mounted in a machine between oppositely disposed flat surfaces of a load bearing member and a race member moving in a straight or curved line or being rotatable relative to said bearing member.

Still another object of the invention consists in the provision of a self-contained bearing of the type referred to.

Still another object of the invention consists in the provision of means for guiding the balls to avoid any choking in the ball track when the balls leave or enter the section under load.

Such a bearing which can be manufactured in series is well adapted for the use in many various mountings, e. g. in lathes in which the slide and also the tailstock are movable in guides, as well as in milling machines and in boring and reaming lathes.

Other objects and details of my invention will become apparent from the following description taken in conjunction with the accompanying drawings, in which like reference characters indicate the same or like parts:

Figs. 1 and 2 are a vertical side view and a horizontal plan view respectively of one form of the improved bearing;

Fig. 3 is a vertical cross sectional view of the bearing and adjacent machine elements taken on the line III—III of Fig. 2;

Figs. 4 and 5 are a vertical side view and a horizontal plan view respectively of a modified form of the bearing;

Fig. 6 is a vertical cross sectional view of the bearing and adjacent machine elements taken on the line VI—VI of Fig. 4; and Fig. 7 is a vertical transverse section through another form of the invention.

Referring to Figs. 1 to 3 of the drawing, the bearing has a base plate 1 consisting of a block having flat and parallel top and bottom faces A and B and a central bar 12. The plate 1 is, e. g., secured to the flat top surface of a slidable machine element 2 by bolts (not shown) in countersunk holes 3 in said plate. An endless groove 4 is formed between the inner wall of a cavity 16 in the plate 1 and the central bar 12 which may be inserted removably into the base plate 1 or secured thereto. Instead thereof the groove 4 can be formed by milling the cavity 16 and the bar 12 have rectilinear side walls and semicircular end walls so that the groove 4 has two rectilinear parallel sections 4a and 4b interconnected at their ends by semicircular sections 4c. A series of hardened steel balls 5 are provided in the groove 4. The bottom of the groove 4 constitutes the ball contact surface. The bottom surface 4b' of the groove section 4b constitutes an idle section which is lower than the bottom surface 4a' of the groove section 4a. Thus, a bar 6 with a hardened upper face to constitute the ball race or contacting surface 4a' is positioned in the groove section 4a. By this arrangement the actual depth of the groove section 4a will be less than the diameter of the balls 5 so that the balls in the groove 4a protrude out of same, i. e. beyond the top face A of the plate 1. The idle groove section 4b will be deeper so that its depth may be larger than the ball diameter or substantially equal thereto as shown in Fig. 3. The bar 6 has at its ends inclined top surfaces 7 forming bridges between the ball contacting raceway sections 4a' and the idle sections 4b'. As will be apparent from Figs. 1 and 3 said bridges form smooth passages between said sections 4a' and 4b'.

A substantially flat plate 8 is secured to the top face A of the base plate 1 and covers the groove sections 4b and 4c. The longitudinal straight edge 9 of the plate 8 forms a rib protruding slightly out over the groove section 4a to overlie a portion of said ball 5 in the groove section 4a. Thereby each roller 5 in the groove 4 will be held in place, i. e. prevented from dropping out of said groove if the bearing is inverted. Thus, this bearing forms a self-contained unit. Both the ends of the straight edge 9 of the plates 8 terminate at curved edge sections 10 which have such configurations that they will overlie a gradually increasing portion of each ball 5 closely when the ball leaves the groove section 4a to move on the inclined surface 7 of the bar 6 into the curved section 4c, i. e. towards the idle groove section 4b. Thus, when the ball 5 advances below the edge 10 the latter contacts with the ball at a point gradually approaching the top of the ball. By suitable configuration of the inclined end surfaces 7 of the bar 6 the same result can be obtained by means of straight edges extending obliquely over the groove 4. Also, instead of a combination with the guide edge 10 the bottom surface of the plate 8 may be provided with a guide for the balls.

It is assumed, by way of example, that the machine element 2 is movable rectilinearly and that the bearing takes the load exerted by said element upon a stationary machine element 20 having a bar 11 forming a hardened ball race contacting with the balls 5 on the raceway section 4a' of the bearing. Thus, the groove 4 comprises two rectilinear groove sections 4a and 4b interconnected at their ends by semicircular groove sections 4c so that it forms an endless ball track having a ball contacting bottom surface, comprising a rectilinear load taking raceway section 4a', viz. the ball race on the bar 6, and a lower rectilinear idle section 4b', viz. the bottom surface of the groove section 4b. The balls 5 will, due to the guiding effect excited by the edges 10, enter and leave the rectilinear groove section 4a easily so that any obstruction to the travel of the balls in the groove 4 will be avoided. Obviously, this self-contained block bearing can be handled as a unit.

In the embodiment as shown in Figs. 4 to 6 the entire raceway is formed on a one-piece member of approximately inverted T-shape in transverse cross-section. The straight central bar section 12 of the raceway has lateral flanges 14, 15 at the sides thereof which are connected by semi-circular flanges at the rounded ends of the central bar section. The central portion of the flange 14 has a raised surface or thickened portion 6 which is hardened to constitute the load-bearing surface 4a' of the raceway. The ends of the thickened portion 6 are connected to the adjacent portions of the lateral flange 14 by inclined bottom surfaces 7, and the upper surfaces of the flange 15, the semi-circular end flanges and the end portions of the lateral flange 14 merge smoothly into each other and are so spaced below the level of the section 6 of flange 14 that only the balls 5 on the section 6 are subjected to loading. As shown in Figs. 5 and 6, the bar 12 has a rib 17 extending around its top edge and being so formed that it will overlie a portion of said ball 5 in the groove 4 closely throughout the length of said groove whereby the balls will be retained in place in same. In order to guide the balls 5 particularly effectively when they leave or enter the groove section 4a the rib 17 is somewhat enlarged at 17' as shown in Fig. 5. The width of the flanges is somewhat greater than the diameter of the balls 5, and the raceway and assembled balls may be loosely inserted into the cavity 16 of the plate 1 or it may be secured to the bottom of said plate or housing by screws 18. The raceway section 4a' may be shaped transversely to the curvature of the balls 5 to constitute a ball race as shown in Fig. 6.

The embodiment as shown in Fig. 7 has substantially the same appearance as that shown in Figs. 4 to 6. In this embodiment the central bar 12 has a suitably hardened lateral flange 14 constituting the bottom of the groove section 4a and forming in its upper face the load taking raceway section 4a' formed as a ball race and being higher than the bottom surface 4b' of the idle groove section 4b. The bar 12 has the lateral ball retaining rib 17 as in Figs. 4 to 6 and the plate 1 has also a lateral rib 19 so that the oppositely disposed ribs 17 and 19 overlie a portion of each ball 5 in the groove section 4b and, if desired, also in the groove section 4a and in the curved groove sections 4c or in part of said curved sections.

It will be understood that although I have described and illustrated a block bearing having a flat bottom face B the term "flat" may designate any equivalent configuration of said face, i. e. a bottom face having rims or other projections being on the same horizontal level if the bearing is mounted on a horizontal flat surface, e. g. the top surface of the machine element 2. The various features of the embodiments as described can be combined in any convenient manner.

The block bearing according to the invention can be designed so as to demand very little space when fastening to a flat surface of a machine element by providing holes through the central bar 12 for fastening bolts, screws or the like, the outside walls of the ball track simultaneously being made very thin, since they will not have to take up any appreciable pressure.

I claim:

1. In a ball bearing of the type including an endless raceway with one linear section having the central portion thereof elevated above the end portions of the raceway; the combination of a unitary member comprising a straight bar and an integral flange providing the inner wall and bottom wall of said linear section of the raceway, said flange having a thickened central portion which tapers down at each end, whereby the bottom wall has an elevated central portion connected to lower level end portions by inclined walls; a housing in which said unitary member is inserted, said housing having a portion opposed to said straight bar of the unitary member to constitute the outer wall for that section of the raceway; means including said housing and unitary member to complete an endless raceway, a series of balls on and substantially filling said endless raceway; and an integral rib on said unitary member and extending partially over said flange to retain balls thereon.

2. The invention as recited in claim 1, wherein said means completing the endless raceway includes an integral flange on said straight bar at the face thereof opposite said first flange.

3. The invention as recited in claim 1, wherein said means completing the endless raceway includes an integral extension of said first flange around said straight bar to complete the bottom wall of the endless raceway.

4. The invention as recited in claim 1, wherein said means completing the endless raceway includes a flanged section of said housing constituting the bottom wall and adjacent outer wall of a portion of said endless raceway, and the bar has an integral rib extending partially over the balls on said bottom wall section provided by said housing.

5. In a ball bearing for use between machine elements having relative sliding movement, the combination with a unitary ball-race member comprising a straight bar of approximately T-shape in cross-section and having flanges extending laterally from a central stem portion, the ends of the stem portion being rounded and the ends of the lateral flanges being connected by integral semi-circular flanges, the central portion of one lateral flange being thickened and surface hardened to constitute the load-bearing surface of the raceway, the ball-supporting surfaces at the ends of the lateral flanges and over the remaining flanges being vertically spaced from the ball-supporting surface of said thickened section to carry no load; of a series of balls on and substantially filling the raceway provided by said flanges, said balls being of a diameter to extend above said central stem portion of the unitary ball-race member in rolling along said thickened section of said one lateral flange, said lateral flanges having a width in excess of the diameter of the balls, and means cooperating with said ball-race member to form an outer wall for said flange raceway, said central stem portion having an integral flange extending partially over the flange raceway to retain the balls thereon.

References Cited in the file of this patent

UNITED STATES PATENTS

| Number | Name | Date |
|---|---|---|
| 613,527 | Richmond | Nov. 1, 1898 |
| 713,183 | Wands | Nov. 11, 1902 |
| 719,951 | Norwood | Feb. 3, 1903 |
| 766,113 | Norwood | July 26, 1904 |
| 905,743 | Norwood | Dec. 1, 1908 |
| 2,546,375 | Schlicksupp | Mar. 27, 1951 |
| 2,559,292 | Ferger | July 3, 1951 |

FOREIGN PATENTS

| Number | Country | Date |
|---|---|---|
| 618,017 | Great Britain | Feb. 15, 1949 |